Jan. 27, 1970   B. L. HAIRSTON   3,491,949
MOBILE APPARATUS FOR BATCHING AND APPLYING LIQUID AND
PARTICULATE FERTILIZER MATERIAL OR THE LIKE
Filed Aug. 9, 1967   2 Sheets-Sheet 1

INVENTOR.
BOB L. HAIRSTON
BY John R. Walker, III
Attorney

Jan. 27, 1970  B. L. HAIRSTON  3,491,949
MOBILE APPARATUS FOR BATCHING AND APPLYING LIQUID AND
PARTICULATE FERTILIZER MATERIAL OR THE LIKE
Filed Aug. 9, 1967  2 Sheets-Sheet 2
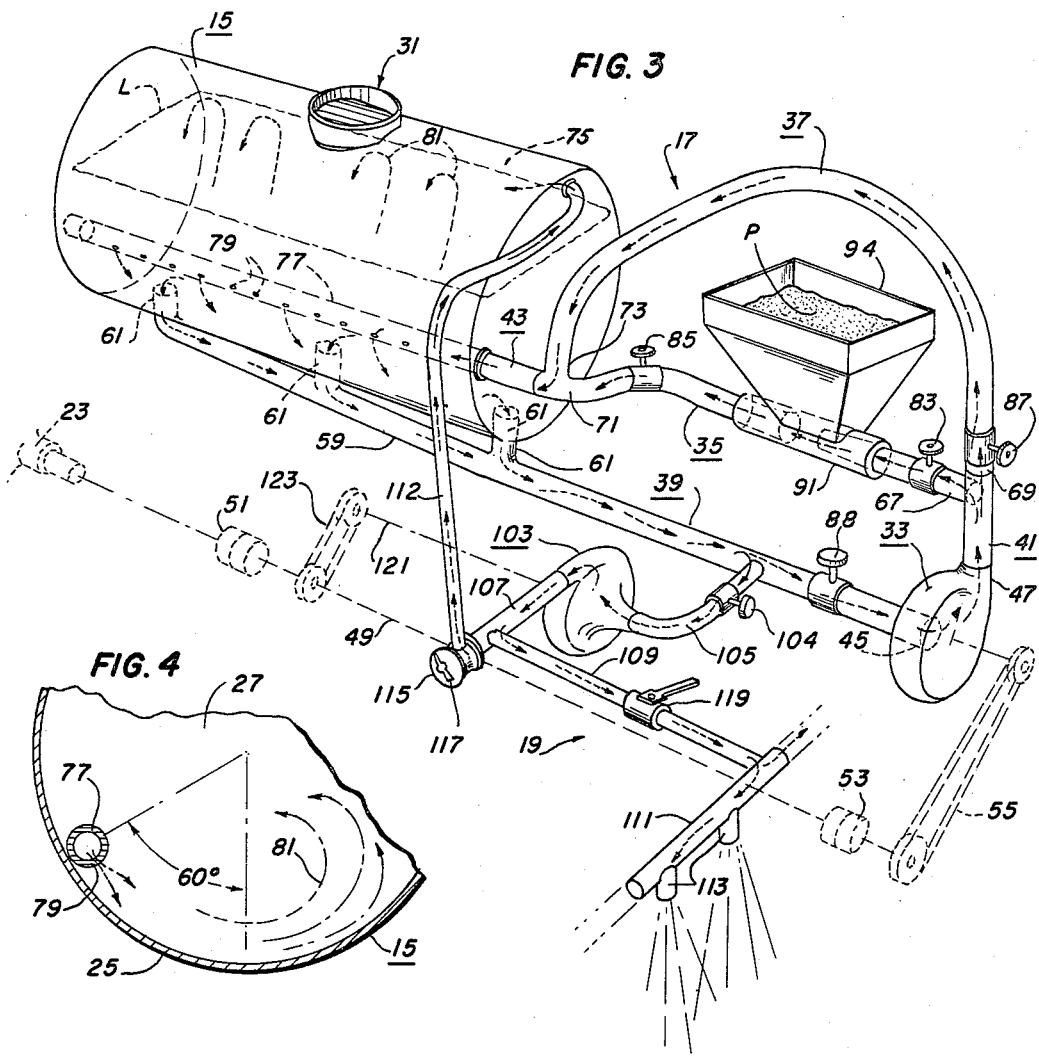
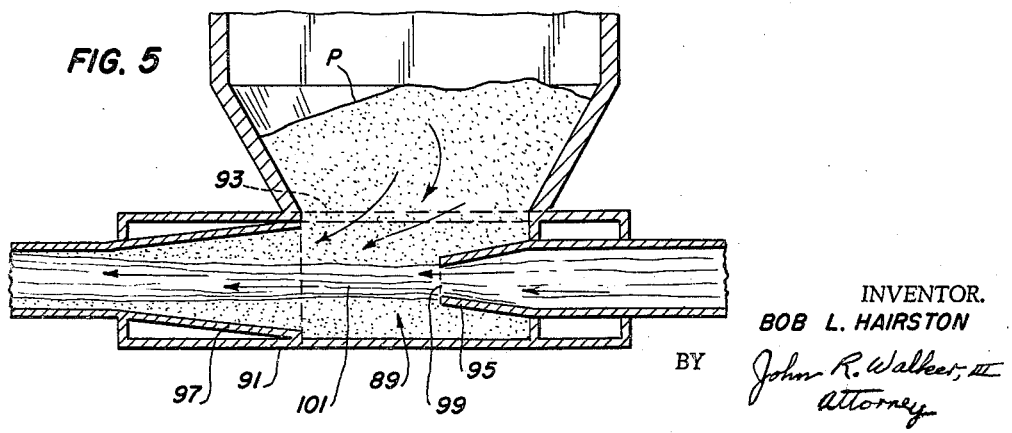
INVENTOR.
BOB L. HAIRSTON
BY John R. Walker, III
Attorney

United States Patent Office 3,491,949
Patented Jan. 27, 1970

3,491,949
MOBILE APPARATUS FOR BATCHING AND APPLYING LIQUID AND PARTICULATE FERTILIZER MATERIAL OR THE LIKE
Bob L. Hairston, Memphis, Tenn., assignor to Forrest City Machine Works, Inc., Forrest City, Ark., a corporation of Arkansas
Filed Aug. 9, 1967, Ser. No. 659,530
Int. Cl. B64d 33/04; B05b 1/20; E01c 19/16
U.S. Cl. 239—127                                8 Claims

ABSTRACT OF THE DISCLOSURE

Mobile apparatus for batching particulate and liquid fertilizer materials and for applying the materials on crop plants or land. The apparatus includes injector means for injecting dry particulate material into the fertilizer liquid thereby forming a semi-liquid or viscous mixture of a desired consistency. The invention also includes means whereby the mixture is maintained in a uniformly mixed consistency while in transport and while being dispensed from the apparatus.

BACKGROUND OF THE INVENTION

Field of the invention

The invention pertains broadly to fluid handling and dispensing apparatuses and particularly to mobile agricultural apparatus for applying liquid and particulate fertilizer chemicals or the like on crops or crop land.

Description of the prior art

In farm land fertilizing, prior practice is to apply a semi-liquid or viscous "blend" of chemical material on the land. Such a blend typically includes both particulate and liquid materials. The ingredients in a typical fertilizer blend may include water, liquid polyphosphates and nitrogen, and dry particulate potash and gelling clay. Additionally, it is often desirable to mix liquid or particulate insecticides, herbicides or other chemicals in with the fertilizer.

Heretofore, the batching and applying of the fertilizer chemicals was carried out by a somewhat complex procedure and also required a considerable outlay of equipment and a number of workmen. The typical fertilizer handling operation includes a relatively large skid-mounted batching plant, several so-called nurse trailers, and several tractor- or trailer-mounted fertilizer applicators. At the batching plant the various components of the fertilizer field blend were mixed together; the liquid and particulate materials were combined to form batches of the fertilizer materials. The nurse trailers were used to transport the materials from the batch plant to the field. At the field a number of tractor-mounted or pull-type applicators dispensed the material over the land or plants. Heretofore, the typical fertilizer-handling procedure was inefficient and resulted in much wasted time and effort.

Certain applicator apparatuses have been designed for mixing chemicals, such as insecticides or herbicides, directly in the applicator mechanism. Such structures are shown in Patents 2,381,649; 2,462,034; 2,583,560 and 3,143,295. In the applicator apparatuses of the above-mentioned patents, the typical manner of mixing the chemical components (insecticides or herbicides, in these patents) is by introducing the components directly into the supply tank. Typically, this was done either by dumping the chemicals through the filler opening of a tank as disclosed in Patent 3,143,295 or by introducing a valve-measured amount into a tank as disclosed in Patent 2,381,649.

In previous applicator mechanisms, and particularly such mechanisms adapted for mixing dry and liquid materials directly in the supply tank, several problems have been noted: (1) The heavier particulate or liquid materials tended to settle to the bottom of the tank or flow passages in the apparatus; (2) in dumping the chemicals into the tank the chemicals tended to concentrate and required considerable time and agitation of the liquids to mix properly; (3) certain powdery fertilizer components tended to float on the surface of the liquid, thus resisting mixing; (4) such mixing which relied principally on the agitation of the chemical components in the supply tank was not effective in making or maintaining a uniform blend of the materials.

SUMMARY OF THE INVENTION

The concept of the invention lies mainly in providing mobile apparatus for batching, transporting, and applying liquid and particulate fertilizer and such means which obviates the necessity of utilizing stationary batch plants, nurse trailers and a number of tractor-mounted applicators in the field. An important feature of the inventive structure intrinsic in the above-mentioned concept is the injector mechanism for injecting dry particulate material into the liquid. Another important feature of the invention resides in utilizing two pump means, providing respectively means for mixing and maintaining a uniform mixture and means for dispensing the fertilizer material.

BRIEF DESCRIPTION OF THE DRAWING

FIG. 3 is a schematic perspective view showing the several flow paths of the liquid in the apparatus.
FIG. 4 is a fragmentary vertical sectional view taken as on the line IV—IV of FIG. 1.
FIG. 5 is a longitudinal vertical sectional view of the injector structure of the apparatus.

DESCRIPTION OF THE PREFERRED EMBODIMENT

Figure 1:
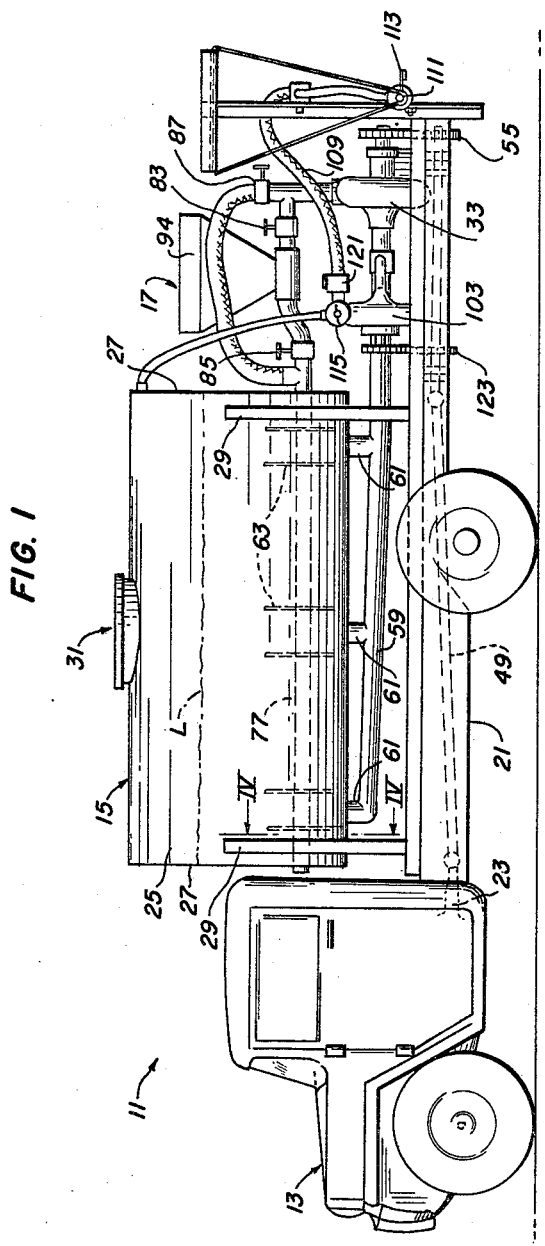
FIG. 1 is a side elevational view of the apparatus of the present invention.
Figure 2:
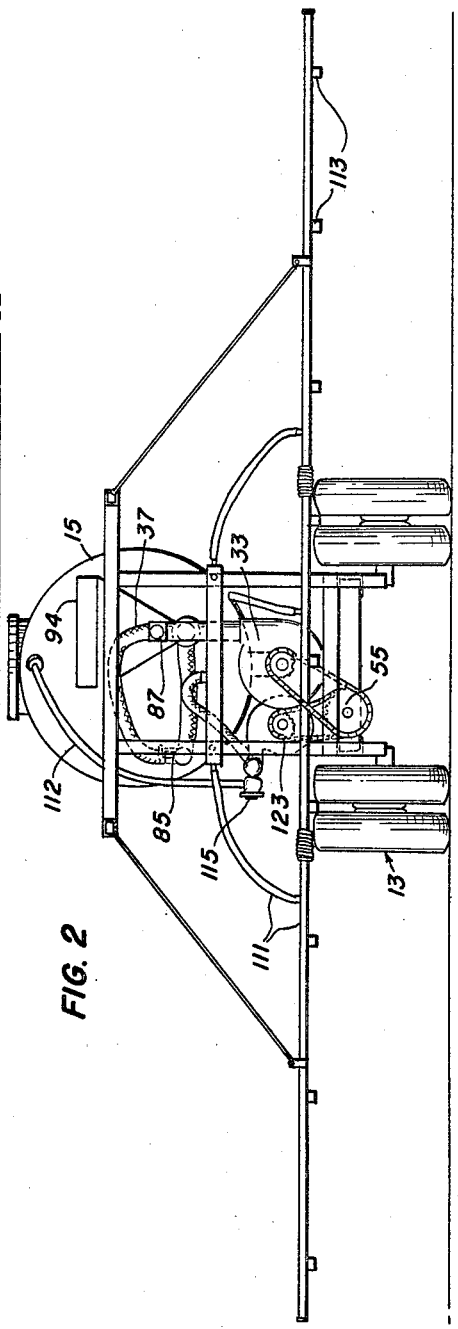
FIG. 2 is a rear elevational view taken as from FIG. 1.

The fertilizer batching, transporting, and applicating apparatus of the invention is indicated 11 and includes basically a truck 13, a supply tank 15 for containing the fertilizer liquid, mixing and stirring means 17 communicating with tank 15 for blending the fertilizer liquid, and dispensing means for dispensing the blended liquid.

Truck 13 is a typical automotive truck having a chassis 21 and power takeoff means 23. Tank 15 is of large capacity and cylindrical in form and includes a lateral cylindrical wall 25 and end walls 27. Upright standards 29 arranged on opposite sides of tank 15 support the tank from truck chassis 21. A filler opening 31 provides access means into the interior of tank 15 for introducing the liquid.

Mixing and stirring means 17 provides means for obtaining and maintaining a uniform mixing of the fertilizer components and for providing a uniform blend or field liquid. Stirring and mixing means 17 includes basically a pump 33, a mixing conduit 35, a stirring conduit 37, and first, second and third mixing and stirring conduits 39, 41 and 43 respectively. Pump 33 preferably is of the centrifugal type and of high-volume low-pressure capacity, and includes an intake side 45 and an exhaust side 47. The drive means for pump 33 includes a drive line 49, driven from power takeoff 23, clutches 51, 53 interposedly fitted in drive line 49, and chain and sprocket means 55 communicating motion from drive line 49 to pump 33. The conduits of mixing and stirring means 17 are preferably large diametered for passage of large volume flows of fertilizer material. Also, although not shown in the drawings, the flow passages and conduits should have minimum bends or interior surface projections for permitting the free passage of liquid through the various conduits.

First mixing and stirring conduit 39 conducts liquid from the bottom level of tank 15 to the intake side 45 of pump 33. Conduit 39 includes a main, generally horizontal section 59 and three vertical sections 61 communicating section 59 with the lower interior of tank 15. That section of conduit 39 which is arranged directly beneath tank 15 is preferably inclined forwardly and upwardly for proper drainage of the tank. Baffle plates 63 fixed transversely in the lower level of tank 15 prevent sloshing of the liquid in the tank and prevents vortex swirls at each tank drain opening. Second mixing and stirring conduit 41 communicates exhaust side 47 of pump 33 with inlet ends 67, 69 respectively of mixing and stirring conduits 35, 37. Likewise, third mixing and stirring conduit 43 communicates the outlet ends 71, 73 respectively of mixing and stirring conduits 35, 37 with the interior 75 of tank 15. Sparger line 77 includes a series of outlet apertures 79 arranged intermittently along the length of the line. (See FIGS. 3 and 4.) The total area of the outlet apertures 79 is preferably in the range of from 150% to 250% of the inside cross-sectional area of the sparger line 77 itself, with the optimum total area being 200% of said cross-sectional area. For example, with a sparger line having an inside diameter of 2" and with the number of apertures 79 being ten, the optimum area of each aperture 79 would be .628 sq. inch or .89 inch in diameter. Sparger line 77 preferably is arranged adjacent cylindrical lateral wall 25 of tank 15 and preferably at approximately 60° upwardly from the center vertical plane of the tank. Outlet apertures 79 are directed generally downwardly and tangent to the adjacent interior wall surface of the tank. In operation of the apparatus, the sparger functions to cause a rolling action of the liquid contained in the tank as indicated by arrows 81. The sparger 77 also creates a shearing action within the fluid at each orifice. This is highly desirable in mixing and dispersing small particles of solids in the mixture. Because of the pressure drop at each orifice of the sparger, pressure is converted to velocity thereby further dispersing and mixing. Thus, the sparger mixes in three distinct ways: First by creating a high velocity at each orifice due to pressure drop across the orifices, this mixes very small particles with high energy in small masses. Secondly, the jet stream from the velocity causes shearing and mixing several feet into the tank. Thirdly, as this jet stream is directed around the sides of the tank a large amount of material is displaced thus causing bulk mixing.

Hand operable valves 83, 85 and 87 fitted respectively in mixing conduit 35 and stirring conduit 37 optionally direct the flow of fertilizer liquid through either the mixing or the stirring conduit or regulates the simultaneous flow through both conduits. A hand operable cut-off valve 88 is fitted in conduit 39 adjacent intake 45.

Injector means is provided for injecting dry particulate material into the flow of liquid passing through mixing conduit 35 (see FIGS. 3 and 5): Mixing conduit 35 is interrupted or severed and defines an open space 89 between the severed portions. A cylindrical case 91 is sealingly secured around the severed mixing conduit. The upper portion of cylindrical case 91 is cut out and defines an elongated opening 93 extending longitudinally in case 91. A hopper 94 for receiving the dry particulate material is secured on case 91 with the lower interior thereof communicating with the interior of the case. The confronting terminal portions respectively of the upstream and downstream parts of conduit 35 are fitted respectively with small and large frusto-conical terminal portions 95, 97. The progressively reduced inner surface of portion 95 defines a restricted orifice 99. The flow of material passing through conduit 35 and orifice 99 provides a strong jet stream 101 in the conduit. The funnel-shaped inner surface of frusto-conical portion 97 is concentrically arranged with jet stream 101 and operatively funnels the particulate material into the conduit.

When a workman desires to mix a quantity of dry particulate material indicated P with the fertilizer liquid L, valve 87 in stirring conduit 37 is closed and valves 83, 85 are opened. This directs the flow of liquid through mixing conduit 35 and out of sparger line apertures 79 into the interior of tank 15. The jet stream issuing from orifice 99 engages the dry particulate material and carries the material from hopper 94 through sparger 77 and into the tank. Also, at the same time air is drawn in through hopper 94 and enters tank 15 which aids in the mixing. After a sufficient quantity of the particulate material has been introduced into the liquid, valves 83, 85 of conduit 35 are closed and valve 87 of conduit 37 opened. This will direct the flow of fertilizer liquid through the stirring conduit and into tank 15 and will shunt the liquid around the dry particulate injector means of the apparatus. As the apparatus is being moved over the field being fertilized, in many instances it is desirable that the liquid be directed through stirring conduit 37 so that the material may be kept in a uniform mixture as it is being applied on the field.

Dispensing means 19 includes a dispensing pump 103; an intake conduit 105; first, second and third feed lines 107, 109, 111; and a bypass line 112. Third feed line 111 serves as a distributor line for distributing the fluid over the crop or land being treated. Nozzles 113 or other suitable applicator devices are fitted intermittently on feed line 111 for discharging the liquid along desired tracts or plant rows. Dispensing pump 103 is preferably a multi-stage centrifugal type pump of relatively low-volume high-pressure capacity. Intake conduit 105 preferably, though not necessarily, communicates the intake side of pump 103 with first mixing and stirring conduit 39. A hand operable cut-off valve 104 is fitted in conduit 105. It may be desirable in certain applications of the invention to tap intake conduit 105 into other components of the apparatus; in certain installations it may be desirable to tap the intake conduit directly into the supply tank and draw fertilizer liquid from the tank.

A calibrated bypass valve 115 is fitted in bypass line 112 and regulates the pressure in conduit 109 and the pressure on the liquid issuing from nozzles 113. By manipulating bypass valve knob 117 the desired pressure on the feed lines and nozzles may be obtained. Bypass line 112 returns the bypass fluid to tank 15. A lever-type quick-cutoff valve 119 is fitted in feed conduit 109 for quickly starting and stopping the flow of liquid through nozzles 113. The operator of the apparatus actuates valve 119 at the beginning and end of the respective passes through the field being fertilized. A drive line 121 and chain and sprocket means 123 drives pump 103 from drive line 49. With both clutches 51 and 53 in drive line 49 in engaged disposition, both the mixing and stirring pump and the dispensing pump are operative, and with valve 119 in an open disposition the apparatus will simultaneously dispense fluid through nozzles 113 and recirculate and agitate the liquid in tank 15. With clutch 51 engaged and clutch 53 disengaged dispensing pump 103 alone will be driven and the liquid agitating components of the apparatus will be minimized and in some cases inoperative. Thus, with valve 115 being open there will be some agitation due to flow through line 112, but with valve 115 closed there will be no agitation. Such a drive arrangement may be desirable for use after the fertilizer material has been sufficiently mixed or for use in handling a particular fertilizer blend which tends to maintain uniform consistency.

It will be understood that although the preferred embodiment has been illustrated in connection with fertilizer materials and blends; insecticides, herbicides, and the like, may be used in the apparatus without departing from the spirit and scope of the present invention.

Now, while I have shown and described an exemplary embodiment of the present invention, it will be understood that various modifications and rearrangements of components and elements of structure may be made without departing from the scope of the invention.

I claim:

1. Apparatus for batching fertilizer components and the like to form a "blend" and for applying the blend on crop plants or land comprising an elongated tank for containing the liquid fertilizer and the like; mixing and stirring means for obtaining and maintaining a uniform mixing of the components including a mixing and stirring pump of high-volume low-pressure capacity, a first mixing and stirring conduit communicating the lower level of said tank and the intake side of said mixing and stirring pump, a stirring conduit having an inlet end and an outlet end, a second mixing and stirring conduit communicating the discharge side of said pump with the inlet end of said stirring conduit, a third mixing and stirring conduit communicating the outlet end of said stirring conduit with the interior of said tank including a sparger line extending longitudinally in the interior lower level of said tank and including structure defining a series of outlet apertures arranged intermittently along the length of said sparger line, means for dispensing said blend including at least one discharge nozzle adapted to discharge the blend on the crop plants or land, and means including dispensing pump means of low-volume high-pressure capacity for conducting the liquid blend under pressure through said discharge nozzle; means for selectively operating said mixing and stirring pump and said dispensing pump either together or separately to mix, stir and dispense the blend, as desired; and wheeled vehicle means for transporting as a unit said tank means, said mixing and stirring means, and said dispensing means over the crop plants or land, said vehicle means including power takeoff means operably coupled to said dispensing pump.

2. The apparatus of claim 1 wherein each aperture of said series of outlet apertures arranged intermittently along the length of said sparger line is directed downwardly and toward the interior lateral wall surface of said tank.

3. The apparatus of claim 2 in which the total area of said outlet apertures is in the range of from 150% to 250% of the inside cross-sectional area of said sparger line.

4. Apparatus for batching fertilizer components and the like to form a "blend" and for applying the blend on crop plates or land comprising an elongated tank for containing the liquid fertilizer and the like; mixing and stirring means for obtaining and maintaining a uniform mixing of the components including a mixing and stirring pump of high-volume low-pressure capacity, a first mixing and stirring conduit communicating the lower level of said tank at spaced intervals and the intake side of said mixing and stirring pump, a stirring conduit having an inlet end and an outlet end, a second mixing and stirring conduit communicating the discharge side of said pump with the inlet end of said stirring conduit, a third mixing and stirring conduit communicating the outlet end of said stirring conduit with the interior of said tank; a mixing conduit interposed between said second mixing and stirring conduit and said third mixing and stirring conduit, valve means for directing liquid through either said stirring conduit or through said mixing conduit, and injector means for injecting particulate material into the flow of liquid passing through said mixing conduit; means for dispensing said blend including at least one discharge nozzle adapted to discharge the blend on the crop plants or land, and means including dispensing pump means for conducting the liquid blend under pressure through said discharge nozzle; means for selectively operating said mixing and stirring pump and said dispensing pump either together or separately to mix, stir and dispense the blend, as desired; and wheeled vehicle means for transporting as a unit said tank means, said mixing and stirring means, and said dispensing means over the crop plants or land.

5. The apparatus of claim 4 in which said injector means includes means defining a restricted orifice in said mixing conduit for providing a jet stream in the flow of liquid passing through said mixing conduit and means for introducing powder or particulate material into said jet stream.

6. Apparatus for batching fertilizer components and the like in the form of a "blend" and for applying the blend on crop plants or land comprising an elongated tank for containing the liquid fertilizer and the like; mixing and stirring means for obtaining and maintaining a uniform mixing of the components including a mixing and stirring pump of high-volume low-pressure capacity, a first mixing and stirring conduit communicating the lower level of said tank at spaced intervals and the intake side of said mixing and stirring pump, said first mixing and stirring conduit including a main section inclined forwardly and upwardly and a plurality of vertical sections spaced along the length of said tank and communicating said main section and the lower interior of said tank at drain openings provided in said tank, and in which is included baffle means over said vertical sections for preventing vortex swirls at said drain openings, a stirring conduit having an inlet end and an outlet end, a second mixing and stirring conduit communicating the discharge side of said pump and the inlet end of said stirring conduit, a third mixing and stirring conduit communicating the outlet end of said stirring conduit and the interior of said tank including a sparger line extending longitudinally in the interior lower level of said tank and including structure defining a series of outlet apertures arranged intermittently along the length of said sparger line, and with each of said apertures being directed downwardly and toward the interior lateral wall surface of said tank; means for dispensing said blend including at least one discharge nozzle adapted to discharge the blend on the crop plants or land, and means including dispensing pump means for conducting the liquid blend under pressure through said discharge nozzle; means for selectively operating said mixing and stirring pump and said dispensing pump either together or separately to mix, stir and dispense the blend, as desired; and wheeled vehicle means for transporting as a unit said tank means, said mixing and stirring means, and said dispensing means over the crop plants or land.

7. Apparatus for batching particulate or liquid fertilizer components to form a "blend" and for applying the blend on crop plants or land comprising a tank adapted for containing the fertilizer blend; mixing and stirring means for mixing the liquid and particulate components and for obtaining and maintaining uniform consistency of the fertilizer components including a mixing and stirring pump of high-volume low-pressure capacity, a first mixing and stirring conduit communicating the lower level of said tank and the intake side of said mixing and stirring pump, a mixing conduit having an inlet end and an outlet end, a stirring conduit having an inlet end and a outlet end, a second mixing and stirring conduit communicating the discharge side of said pump with the inlet ends respectively of said mixing conduit and said stirring conduit, a third mixing and stirring conduit communicating the outlet ends respectively of said mixing conduit and said stirring conduit with the interior of said tank, injector means for injecting particulate material into the flow of liquid passing through said mixing conduit, and selectively operative valve means for directing liquid through either said stirring conduit or through said mixing conduit; means for dispensing said fertilizer blend including at least one discharge nozzle adapted to discharge the blend on the crop plants or land, and means including dispensing pump means for conducting the fertilizer blend through said discharge nozzle; and wheeled vehicle means for transporting as a unit said tank means, said mixing and stirring means, and said dispensing means over the crop plants or land.

8. The apparatus as defined in claim 7 wherein said injector means includes means defining a restricted orifice in said mixing conduit for providing a jet stream in the flow of liquid passing through said mixing conduit, and means for introducing powder or particulate material into said jet stream.

References Cited

UNITED STATES PATENTS

| | | | |
|---|---|---|---|
| 3,254,045 | 5/1966 | Sinclair | 259—4 X |
| 3,143,295 | 8/1964 | Booker | 239—127 X |
| 3,393,898 | 7/1968 | Lanier | 259—4 |

M. HENSON WOOD, Jr., Primary Examiner

M. Y. MAR, Assistant Examiner

U.S. Cl. X.R.

137—563; 239—142, 168, 172; 259—95